(12) United States Patent
Dyer et al.

(10) Patent No.: US 6,191,791 B1
(45) Date of Patent: Feb. 20, 2001

(54) METHODS FOR HIGH PRECISION, MEMORY EFFICIENT SURFACE NORMAL COMPRESSION AND EXPANSION

(75) Inventors: Don W Dyer; Paul E Martz; Teresa M Morrison, all of Fort Collins, CO (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 08/940,913

(22) Filed: Sep. 30, 1997

(51) Int. Cl.$^7$ ........................................... G06F 15/00
(52) U.S. Cl. ........................................... 345/429
(58) Field of Search ........................... 345/202, 418, 345/419, 420; 382/232, 242

(56) References Cited

U.S. PATENT DOCUMENTS

| | | | |
|---|---|---|---|
| 5,440,682 | * | 8/1995 | Deering ................................. 395/162 |
| 5,736,987 | * | 4/1998 | Drucker et al. ...................... 345/420 |

OTHER PUBLICATIONS

Excerpt from the World–Wide–Web Site: /home/martz/normals/shpere.faq printed Apr. 7, 1997 and entitled: Topics On Sphere Distributions. Author Dave Rusin, 1995.

"Direct Volume Rendering With Shading Via Three–Dimensional Textures", Allen Van Gelder and Kwansik Kim, 1996 IEEE Symposium On Volume Visualization.

* cited by examiner

Primary Examiner—Phu K. Nguyen
(74) Attorney, Agent, or Firm—Morely C. Tobey, Jr.

(57) ABSTRACT

A high precision, memory efficient method for the compression of surface normals into quantized normals and the inverse method for the expansion of those quantized surface normals back into surface normals. The surface of a three dimensional figure is conceptually divided into small areas, and the effective surface normal for each of these areas is related to the surface normal of a unit sphere tessellated into a similar number of small areas or tiles. A quantized normal is defined to be the tile number on the surface of the unit sphere. For a particular three dimensional figure, instead of storing surface unit normal values of {X,Y,Z} for each coordinate, the quantized surface normal value (i.e., the tile number) is stored. Thus, for a surface normal expressed in Cartesian coordinates, a compression ratio of 6:1 is possible depending upon the memory required to store real and integer values and the desired accuracy. Efficient computational methods for compressing the surface normal by obtaining the appropriate tile number and the inverse expansion of the quantized surface normal into surface normals are described. Regardless of the initial length of the surface normal, the resultant of the combined compression-expansion process is a surface normal of unit length which is the format expected by most standard graphics libraries.

6 Claims, 6 Drawing Sheets

METHODS FOR HIGH PRECISION, MEMORY EFFICIENT SURFACE NORMAL COMPRESSION AND EXPANSION

FIELD OF THE INVENTION

This invention relates generally to computer graphics, and more particularly to the rendering of three dimensional images. More particularly still, the invention relates to a novel method of compression and expansion of surface normal data used in the rendering of three dimensional images.

BACKGROUND

For three dimensional images generated from abstract platonic primitives, such as lines and polygons, computer graphics applications and systems store primitive vertex information such as coordinates of surface points, associated surface normals, and other rendering information such as opacity, color, etc. The surface normals are usually specified as one coordinate point {X,Y,Z} for each vertex of the primitive. The starting point for each of these surface normal vectors is the coordinate system origin.

This procedure for storing surface normals as a set of three floating point numbers introduces several problems. First, in common use, {X,Y,Z} Cartesian coordinates often provide more accuracy than needed for realistic visual representation resulting in inefficient utilization of the resources of memory and computation time. Second, storing a surface normal as an {X,Y,Z} Cartesian coordinate does not guarantee that the surface normal is of unit length, i.e. the distance from the origin to the point {X,Y,Z} is one. Graphics libraries in common use expect to receive surface normal data in unit length and must unitize the surface normals if they are not received as such. Third, representing a surface normal as three floating point numbers, one for each axis, does not produce a uniform distribution of precision between the three values. This situation is especially noticeable when the normal is aligned or nearly aligned with one of the three major axes. And fourth, using common single precision floating point formats, the total space required to store a surface normal is three 32-bit full words, or 12 bytes. When several hundred-thousand surface normals need to be stored, along with other geometric and application data, upper bounds on system memory resources can be reached. This situation limits the maximum size of the image that can be rendered at any given time.

A technique used to address the above problems is to represent and store surface normals as spherical or polar coordinates instead of Cartesian coordinates. Using this technique two floating point values are specified, one for the longitude or polar angle and one for the latitude or azimuthal angle, and results in a 3:2 date compression ratio for the surface unit normal. Required memory could be reduced further, with reduced accuracy, by storing the latitude and longitude as two short integers, each of which requires 2 bytes of memory, for a total of 4 bytes, resulting in a 3:1 data compression ratio. However, the numeric precision is still unevenly distributed between the two coordinate values of longitude and latitude. If the normal position is near latitude $\pi/2$ or $-\pi/2$ (i.e., near the poles), the longitude value provides much greater precision than when the latitude is near 0 (i.e., near the equator).

Another technique for storing the surface unit normals is to use an abstract single number representation. This technique involves a tessellation of a sphere obtained by combining the vertices of two platonic solids, the icosahedron and the dodecahedron. Then, a 4-deep triangle subdivision of the resulting 60 equilateral triangles is performed giving a sphere covered with 7680 triangles. A normal is mapped into an abstract value by first determining which of the original 60 triangles contains the normal. Then 128 dot products with the normal to the 128 interior triangles are performed. The largest dot product indicates the best matching triangle for the incoming normal. The result of these computations is used as the compressed normal. To uncompress, the compressed normal is used to index a table of pre-computed values. Calculation of the numerous dot products required in this technique is computationally inefficient. Higher resolution, i.e., more and smaller triangles, results in even more involved computations. Much of the memory savings inherent in this technique is lost because of the size of the lookup table. Also, the range of compressed normals is limited by the size of the decompression table which puts an upper limit on their accuracy.

This technique is often used to map normals to pre-computed lighting values using a lookup table as above with the lighting values instead of normals. Used in this manner, when the lighting direction to the model is changed, the values in the look-up table must be recomputed, resulting in additional computation time. Because a lighting look-up table is used, this algorithm does not address the issue of converting back to the original surface normal coordinates, and thus is not a data compression technique in the purest sense.

A need, therefore, exists for further improvements in compression methods used for storing surface normal data to be used in rendering three dimensional images.

SUMMARY OF THE INVENTION

In a representative embodiment of the methods for compression of surface normals into quantized normals and the inverse expansion of quantized normals into surface unit normals, the surface of a unit sphere is divided into a large number of small, nearly-equal-sized areas or tiles. To generate these tiles, the surface of the unit sphere is divided into equal width latitudinal bands. Each band is then divided into equal length units which are approximately equal to the width of the latitude bands. The maximum number of tiles in a band occurs at the equator with the number of tiles in each band decreasing the closer the band is to one of the poles.

The tiles of the surface of the unit sphere are numbered from 0 to the total number of tiles minus one. The number of tiles may be, for example, the largest value that can be efficiently stored in a computing system, such as an unsigned integer. Depending upon the particular number space used an unsigned integer value may typically range from 0 up to 2 raised to the power of 16 minus 1 or 2 raised to the power of 32 minus 1. In general, the larger the number of tiles, the less the average error between the original surface normal and the resulting quantized normal. However, a larger number of tiles may result in a smaller compression ratio.

A quantized normal representation is the tile number on the surface of the unit sphere. The center of each numbered tile represents all normal vectors which pass through that tile. For a particular three dimensional abstract image, instead of storing surface unit normal values of {X,Y,Z} for each coordinate, the quantized surface normal value (i.e., the tile number) it stored.

Memory requirements for the storage of surface normals of three dimensional graphical images are substantially reduced in contrast to other techniques used in the art. A compression ration of 6:1 over that of using the surface normal Cartesian coordinates {X,Y,Z} is attained. A look-up table is not required in this technique. In addition, conversions from the surface normal coordinates of Cartesian, polar, spherical, or other coordinate systems to the quantized normal representation is computationally efficient.

Other aspects and advantages of the invention will become apparent from the following detailed description, taken in conjunction with the accompanying drawings, illustrating by way of example the principles of the invention. The details disclosed in the specification should not be read so as to limit the invention.

DETAILED DESCRIPTION OF THE PREFERRED EMBODIMENTS

As shown in the drawings for purposes of illustration, the present invention relates to a novel method of compression and expansion of surface normal data used in the rendering of three dimensional images. As an intermediate step in a representative embodiment, surface unit normal data is stored in compressed format and then used to render three dimensional images on the screen of a computer, a printer, or other appropriate device. Previous methods for compression of surface normal data have relied upon the use of spherical or polar coordinate systems instead of the Cartesian coordinate system, thereby reducing the need to store three floating point numbers representing the {X,Y,Z} coordinates of the surface normal to only two representing the azimuthal and polar angles, or have relied upon look-up tables. Such methods have emphasized speed of rendering over conservation of memory. A representative embodiment of the present invention provides a memory efficient, computationally efficient method of compressing and expanding surface normals of three dimensional images. In the following detailed description and in the several figures of the drawings, like elements are identified with like reference numerals.

Figure 1:
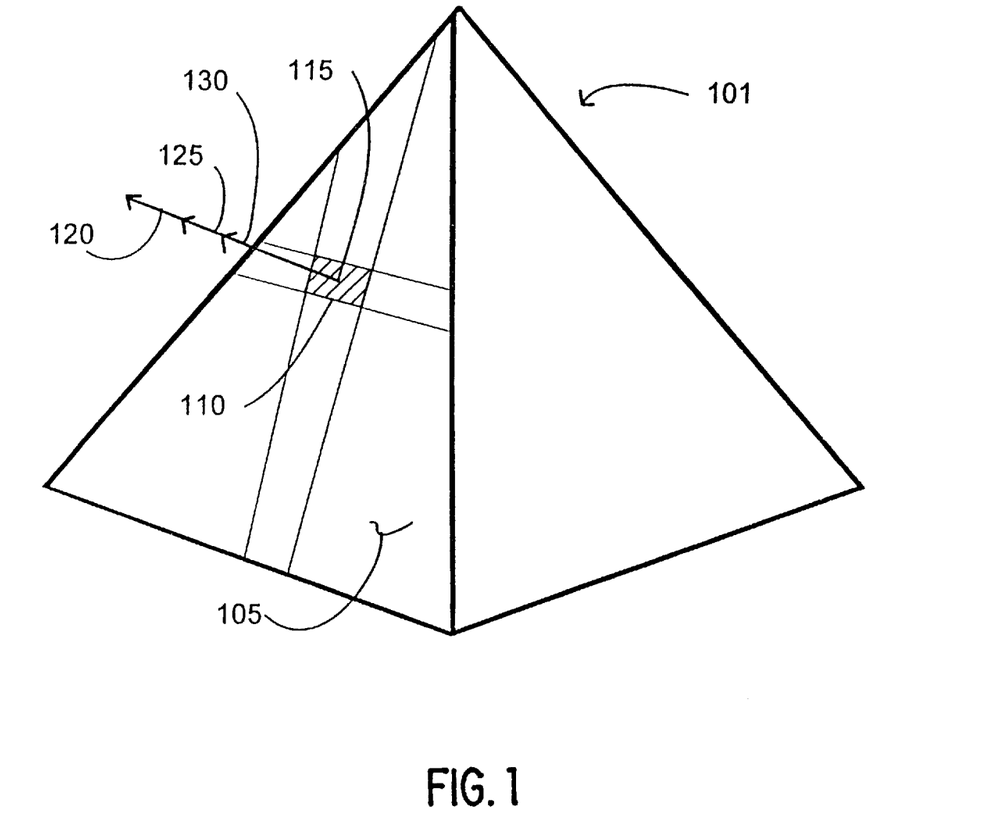
FIG. 1 is a three dimensional drawing of a tetrahedron showing a surface unit normal associated with a small area.
Figure 2:
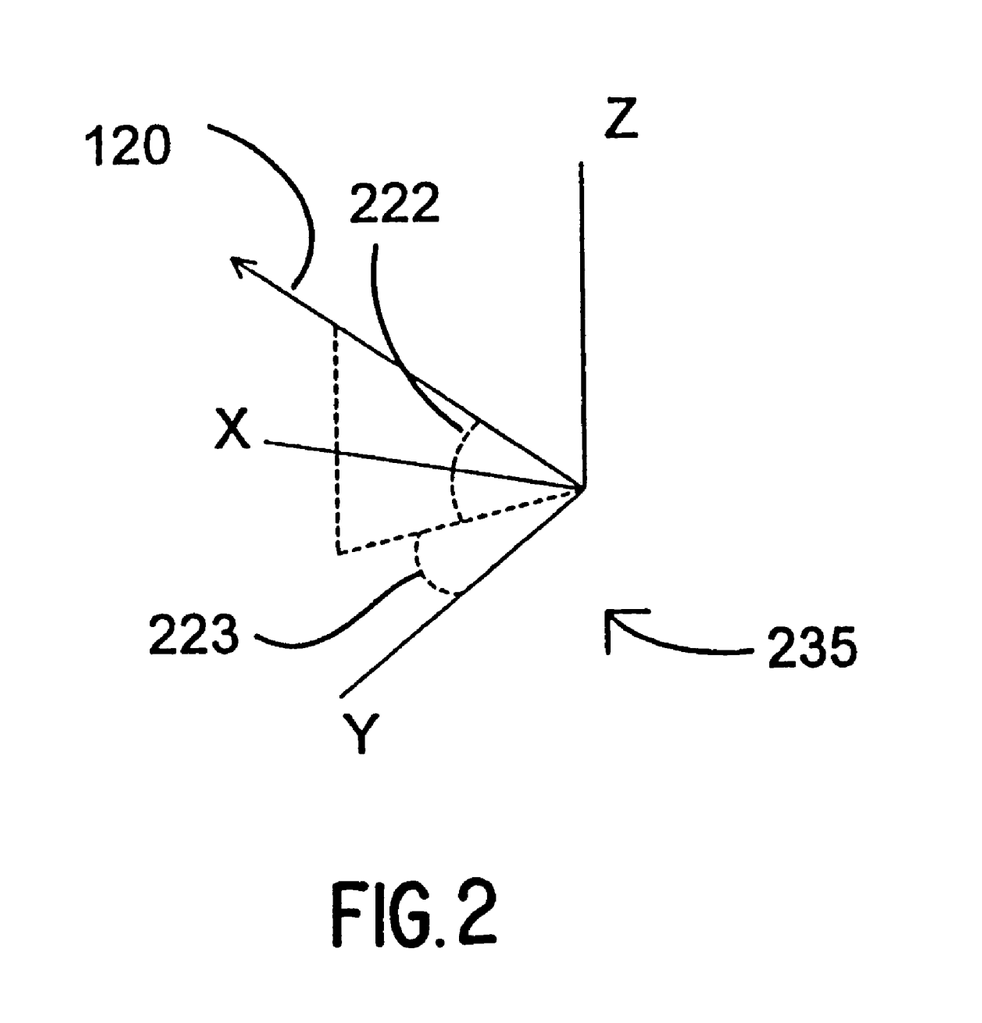
FIG. 2 is a diagram illustrating a spherical coordinate system.

FIG. 1 is an illustrative drawing of a three-dimensional-figure 101, a tetrahedron in this example, having a surface 105. A small-surface-area 110 on the surface 105 surrounds a point 115. The point 115 has a surface-normal 120 which has direction perpendicular to the surface 105 at the point 115 and which is described by three floating point numbers {X,Y,Z} representing vector coordinates of the surface-normal 120. The surface-normal 120 at the point 115 is assumed to represent the surface-normal 120 for all points 115 lying within the small-surface-area 110. Although only one small-surface-area 110 is shown in FIG. 1, the surface 105 is conceptually divided into many small-surface-areas 110 of approximately equal areas. If the surface-normal 120 is represented by three floating point coordinates {X,Y,Z} of a surface-normal-coordinate-system 235 as shown in FIG. 2, this representation is first transformed into spherical coordinates wherein the surface-normal 120 is represented by a latitude 222 and a longitude 223. Note that the location and orientation of the surface-normal-coordinate-system 235 is completely arbitrary, as is the coordinate system type. In fact, the surface-normal-coordinate-system 235 could be Cartesian, spherical or any other three dimensional, orthogonal system. Thus, the surface-normal-coordinate-system 235 shown in FIG. 2 is shown for illustrative purposes only. This spherical coordinate representation of the surface-normal 120 then is compressed into a quantized-surface-normal 125. Shown for illustrative purposes as a vector parallel to the surface-normal 120 in FIG. 1, the quantized-surface-normal 125 is, however, defined by a single number which could be, for example, an unsigned integer. Representations which could be chosen for the quantized-surface-normal 125 will be discussed later in this document.

A representative embodiment for the expansion of the quantized-surface-normal 125 into an expanded-surface-unit-normal 130 is also disclosed. Note that the surface-normal 120 is not required to be of unit length. However, as will be seen, the combined processes of compression and expansion result in the expanded-surface-unit-normal 130 being of unit length which is the format expected by most standard graphics libraries. Note also that for compression and expansion in which the small-surface-area 110 is of zero size, the surface-normal 120 and the expanded-surface-unit-normal 130 will be parallel, as they are shown in FIG. 1. However, for cases in which the small-surface-area 110 has a finite size, the surface-normal 120 and the expanded-surface-unit-normal 130 will be only approximately parallel.

One complete tetrahedral face of the three-dimensional-figure 101 could have been represented by the single surface-normal 120 and the associated single quantized-surface-normal 125. However, for purposes of illustration this relatively simple figure is conceptually broken up into a number of small-surface-areas 110 as a more complicated surface, such as a curved surface, would be.

Figure 3:
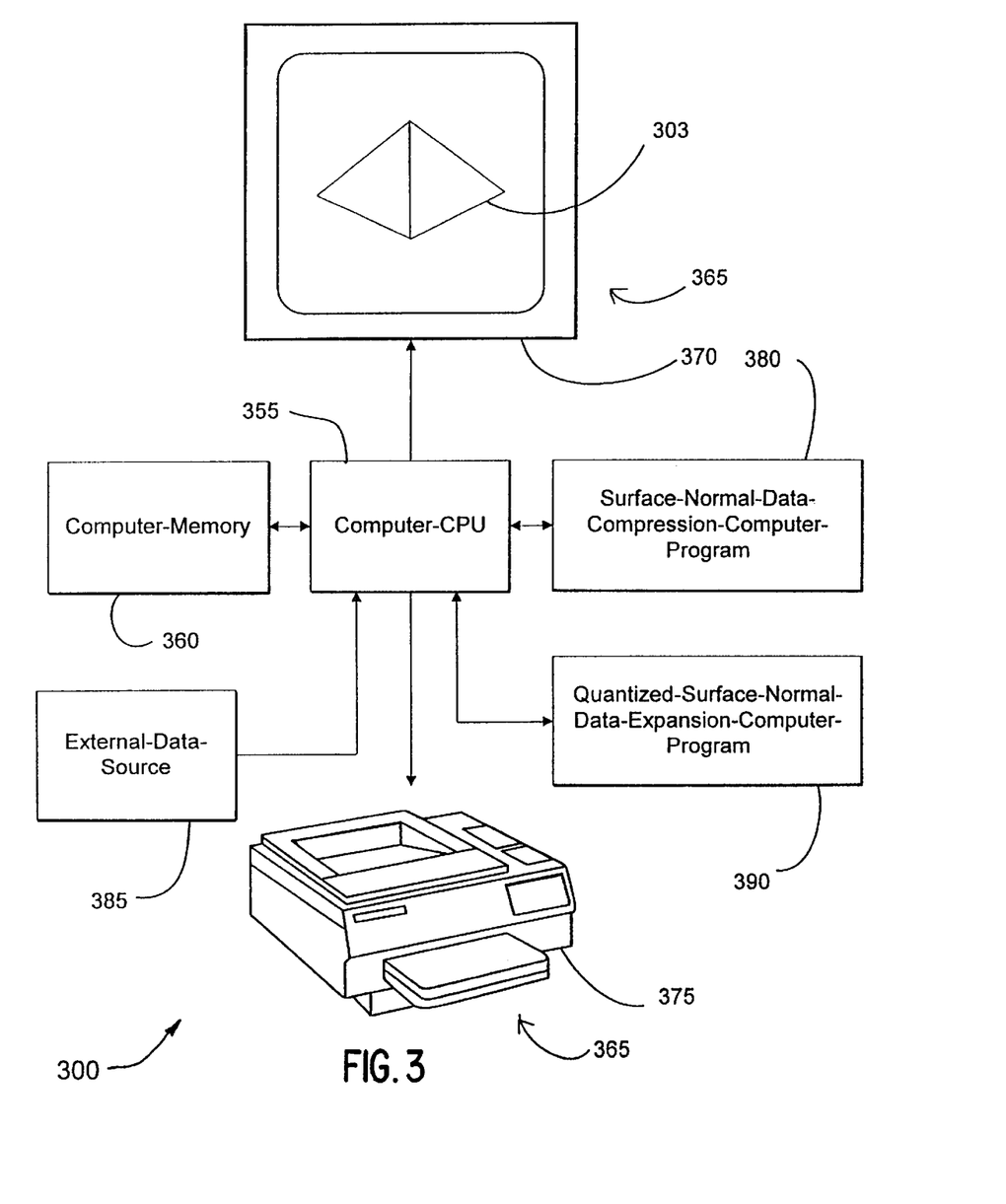
FIG. 3 is a schematic drawing of a computer system suitable for rendering a three dimensional image using methods for surface normal compression and quantized surface unit normal expansion according to a preferred embodiment of the invention.

FIG. 3 is a schematic drawing of a computer-system 300 for rendering the three-dimensional-figure 101 of FIG. 1 into a three-dimensional-image 303 as shown in FIG. 3 using methods of compression for the surface-normals 120 of points 115 on the three-dimensional-figure 101 and corresponding expansion of the quantized-surface-normal 125 into the expanded-surface-unit-normal 130. In this embodiment the computer-system 300 comprises the following hardware: a computer-CPU 355, a computer-memory 360, and a display-device 365 which in this figure is represented both as a computer-monitor 370 and as a printer 375. A surface-normal-data-compression-computer-program 380 loaded in the computer-system 300 obtains input data containing the surface-normals 120 for the three-dimensional-figure 101 either internally from the computer-memory 360, which may be for example hard magnetic disk, floppy disk, or computer active memory, an external-data-source 385, which may be for example a computer operator, a communications network, another computer system, or other means. As will be shown in the following, the surface-normal-data-compression-computer-program 380 compresses surface-normals 120 into quantized-surface-normals 125 and stores those values. A quantized-surface-normaldata-expansion-computer-program 390 expands quantized-surface-normals 125 for use in the rendering of the three-dimensional-figure 101 into the three-dimensional-image 303 on the computer-monitor 370, the printer 375, or another display-device 365.

Figure 4:
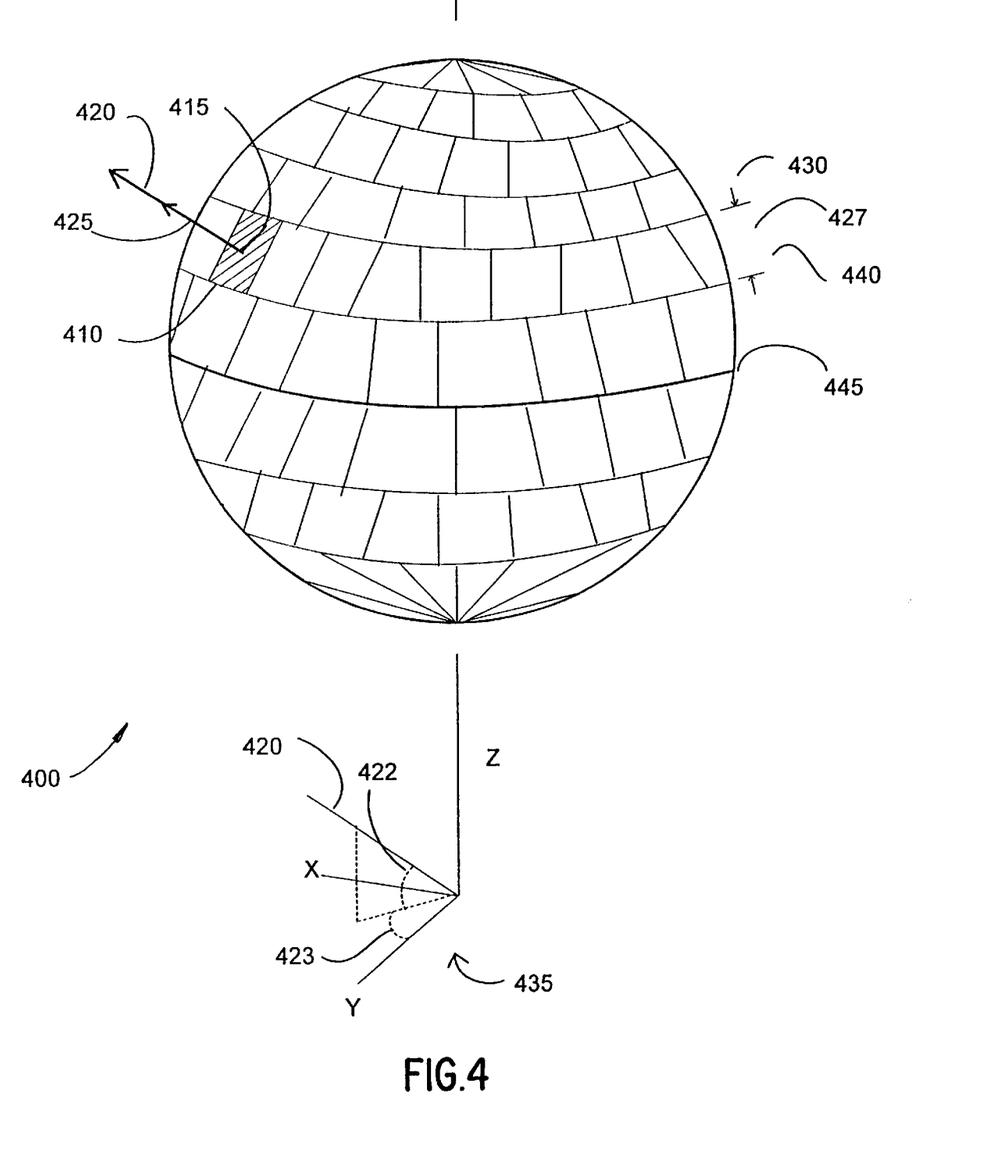
FIG. 4 is a three dimensional drawing of a unit sphere tiled according to a preferred embodiment of the invention.

FIG. 4 is a three dimensional drawing of a unit-sphere 400 whose surface is divided into a multiplicity of unit-sphere-tiles 410 having approximately equal areas and each surrounding a unit-sphere-point 415 as in a representative embodiment of the method described in the present patent document. Also in FIG. 4 one of the unit-sphere-tiles 410 is shown cross-hatched with a unit-sphere-surface-normal 420 drawn within the unit-sphere-tile 410.

The unit-sphere 400 is divided or tessellated into multiple nearly-equal-sized areas or as specified herein unit-sphere-tiles 410. In the representative embodiment, this number is the largest value that can be efficiently stored in a computing system, such as an unsigned integer which could be, for example, the number two raised to the power of sixteen or, as another example, two raised to the power of thirty-two as currently defined and used in common computer-systems 300. Generally, the smaller the number of unit-sphere-tiles 410, the greater compression possible with accompanying greater average error between the surface-normals 120 of the three-dimensional-figure 101 and resulting quantized-surface-normals 125. Other factors which may be used to select the maximum number of tiles include, but are not limited to the following: (1) sensitivity to visual artifacts from error between the surface-normal 120 and the quantized-surface-normal 125, (2) desired or required normal data compression ratio, (3) efficient data sizes for the computer-system 300, and (4) efficient or required data alignment issues for the computer-system 300. However, the number two raised to the power of sixteen or the power of thirty-two provides the largest number of unit-sphere-tiles 410 given memory allocations for various number types in common computer-systems 300.

Using quantized-surface-normals 125, the size of an unsigned integer allows the surface-normal 120 to be represented in significantly less space. Depending upon number system representations in the computer-system 300 the compression ratio could be 6:1 compared to Cartesian representation.

FIG. 4 shows only representative numbers of unit-sphere-tiles such as unit-sphere-tile 410. The center of unit-sphere-tile 410 represents all normal vectors that pass through unit-sphere-tile 410 for every unit-sphere-point 415 in unit-sphere-tile 410. A unit-sphere-coordinate-system 435 is also shown in FIG. 4. The Z-axis of the unit-sphere-coordinate-system 435 is colinear with the polar axis of the unit-sphere 400. However, for clarity of illustration, the origin of the unit-sphere-coordinate-system 435 is shown displaced along the Z-axis from its true location at the center of the unit-sphere 400. A unit-sphere-tile-latitude 422 is the latitude of the unit-sphere-surface-normal 420, and a unit-sphere-tile-longitude 423 is the longitude of the unit-sphere-surface-normal 420.

In the representative embodiment, these unit-sphere-tiles 410 are numbered from 0 to the maximum unsigned integer value (which, as stated above, could be the number two raised to the power of thirty-two minus one). The number of each unit-sphere-tile 410 is defined to be a unit-sphere-quantized-surface-normal 425. The unit-sphere-quantized-surface-normal 425 then is the compressed value for the unit-sphere-surface-normal 420 of the unit-sphere 400. The surface of the unit-sphere 400 is divided into a multiplicity of unit-sphere-latitude-bands 427. Each unit-sphere-latitude-band 427 is divided into a multiplicity of unit-sphere-tiles 410 of equal length within any given unit-sphere-latitude-band 427. The maximum number of unit-sphere-tiles 410 in a unit-sphere-latitude-band 427 occurs at a unit-sphere-equator 454 and is referred to as an equator-number-of-quantized-surface-normals 440. The number of tiles 415 in each unit-sphere-latitude-band 427 decreases the closer the bands are to the poles. In rendering a three-dimensional-image 303, surface-normals 120 are quantized by matching the unit-sphere-surface-normal 420 of the unit-sphere 400 to the surface-normal 120 of the three-dimensional-figure 101. This matching is accomplished by comparing the latitude 222 and the longitude 223 of the three-dimensional-figure 101 with a unit-sphere-latitude-band-width 430 encompassing the unit-sphere-latitude-band 427 and the longitude 223 of the three-dimensional-figure 101 with the longitude range of the unit-sphere-tile 410 around the corresponding unit-sphere-quantized-surface-normal 425.

The representative embodiment provides the mechanism to compress or map the surface-normal 120 in Cartesian, polar, spherical, or any other coordinate system into the quantized-surface-normal 125 for the small-surface-area 110 through which it passes. An inverse mechanism is described to map from the quantized-surface-normal 125 back to the expanded-surface-unit-normal 130 in Cartesian, polar, spherical, or any other coordinate system. The expanded-surface-unit-normal 130 is needed at the time the three-dimensional-figure 101 is rendered as the three-dimensional-image 303 on the display-device 365 of the computer-system 300.

Figure 5:
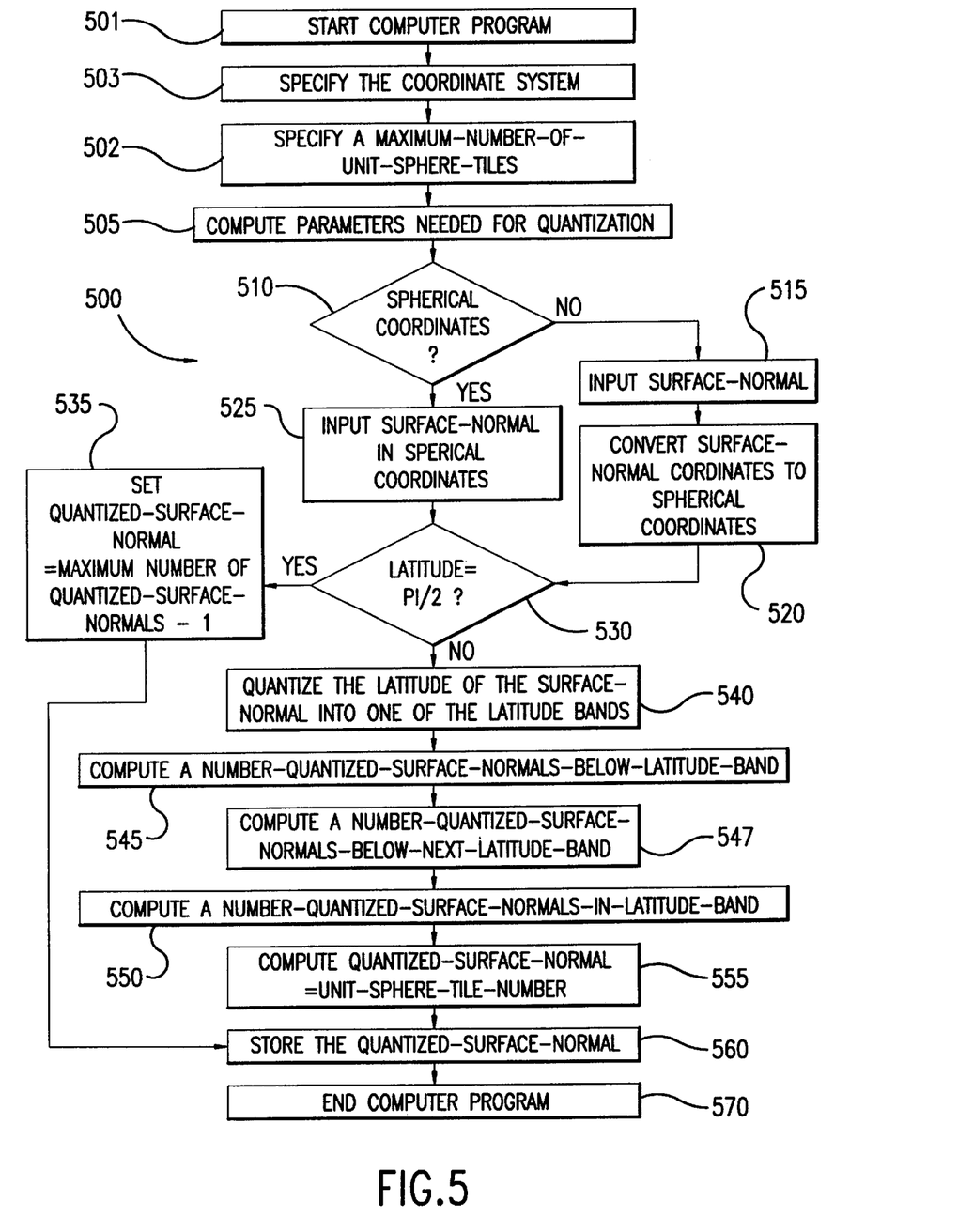
FIG. 5 is a flow chart of a computer program to compress a surface normal into a quantized surface unit normal according to a preferred embodiment of the invention.

Throughout this description of the representative embodiment, the following terminology is used:

q_norms = The total number of quantized-surface-normals 125 or unit-sphere-tiles 410 on the surface of the unit-sphere 400. This parameter is a positive integer, and could be, for example 2 raised to the power of 16 or 2 raised to the power of 32. In FIGURE 5, q_norms, the total number of quantized-surface-normals 125, is also referred to as maximum-number-of-unit-sphere-tiles 502.

Q = The quantized-surface-normal 125 which is shown as a vector in FIGURE 1, but is in fact a non-negative, scalar integer in the range $0 <= Q < q\_norms$. In FIGURE 5, Q is also referred to as unit-sphere-tile-number 555.

lat_size = The width of a unit-sphere-latitude-band 427 or equivalently the unit-sphere-tile 410. This parameter is a floating point number with the value of "$2*sqrt(\pi/q\_norms)$". The average surface area of the unit-sphere-tiles 410 on the unit-sphere 400 is lat_size raised to the power of 2.

e_q_norms = The number of the quantized-surface-normals 425 or equivalently the number of the unit-sphere-tiles 410 which fit around a unit-sphere-equator 445 of the unit-sphere 400. This parameter is an integer value and is equal to "$round(sqrt\ (\pi*q\_norms))$". Since the distance around the unit-sphere 400 in a plane through the poles is the same as around the unit-sphere 400 at the unit-sphere-equator 445, the number of the unit-sphere-latitude-bands 427 is defined to be -continued

| | |
|---|---|
| | e_q_norms divided by 2. In FIGURE 4, e_q_norms is also referred to as equator-number-of-quantized-surface-normals 440. |
| qlat = | The latitude of the unit-sphere-latitude-band 427 into which the surface-normal 120 is quantized. This variable is a floating point number. |
| nqn_below_qlat = | The number of quantized-surface-normals 125 which are less than qlat. This variable is a non-negative integer. If qlat = −π/2, it is zero. In FIGURE 5, nqn_below_qlat is also referred to as number-quantized-surface-normals-below-latitude-band 545 and in FIGURE 6 as number-quantized-surface-normals-below-latitude-band 625. |
| nqn_below_next_qlat = | The number of quantized-surface-normals 125 below the unit-sphere-latitude-band 427 just above qlat. This variable is a positive integer in the range (0 < nqn_below_next_qlat < q_norms); In FIGURE 5, nqn_below_next_qlat is also referred to asnumber-quantized-surface-normals-below-next-latitude-band 547 and in FIGURE 6 as number-quantized-surface-normals-below-next-latitude-band 630. |
| nqn_qlat | The number of quantized-surface-normals 125 contained within a given unit-sphere-latitude-band 427. This variable is a positive integer and is the difference between the number of quantized-surface-normals 125 below the next highest unit-sphere-latitude-band 427 above qlat and nqn_below_qlat. In FIGURE 5, nqn_qlat is also referred to as number-quantized-surface-normals-in-latitude-band 550 and in FIGURE 6 as number-quantized-surface-normals-in-latitude-band 633. |

Numbers are assigned to quantized-surface-normals 425 in order from negative latitude to positive latitude, and from negative longitude to positive longitude. So, given any two quantized-surface-normals 425 lying in two different unit-sphere-latitude-bands 427, the normal with the smaller Q will have a lower latitude than the other quantized-surface-normal 425. Similarly, given any two quantized-surface-normals 425 lying in the same unit-sphere-latitude-band 427, the normal with the smaller Q will have lower longitude than the other quantized-surface-normal 125.

This numbering scheme has the following important property: (area below latitude)/4π=(number of quantized normals below latitude)/q_norms. In other words, the area of the unit-sphere 400 below a particular unit-sphere-latitude-band 427 is proportional to the total number of quantized-surface-normals 425 below that unit-sphere-latitude-band 427.

Q is the sum of two numbers, (1) the number of quantized-surface-normals 425 below the unit-sphere-latitude-band 427 and (2) the number of quantized-surface-normals 425 in the unit-sphere-latitude-band 427 below the particular longitude.

FIG. 5 is a flowchart of a representative embodiment of the surface-normal-data-compression-computer-program 500 that compresses or maps the Cartesian, polar, spherical, or other coordinate system surface-normal 120 into the quantized-surface-normal 125.

Block 501 is the entry block to the surface-normal-data-compression-computer-program 500 and initiates the procedures described in the following paragraphs. Block 501 transfers control to block 503.

Block 503 ascertains the coordinate system in which data for the surface-normal 120 is obtained. Specification of the coordinate system may be obtained, for example, by manual input from the computer user, from computer stored memory, from a file stored on a floppy disk or a hard disk, or as values passed to the computer program at its initiation. Control then is transferred to block 502.

Block 502 ascertains a maximum-number-of-unit-sphere-tiles 502 which is also referred to as q_norms. Control then is transferred to block 505.

Block 505 computes parameters which will be used in the blocks following. In particular, the width of the unit-sphere-latitude-band 427 or equivalently the unit-sphere-tile 410, $lat_{13}$ size, is computed as follows: lat_size =2* sqrt(π/q_norms). Also, the number of unit-sphere-quantized-surface-normals 425 which fit around the unit-sphere-equator 445 of the unit-sphere 400, e_q_norms, is computed as follows: e_q_norms=round(sqrt (π*q_norms)). Control then is transferred to block 510.

If surface unit normal data is obtained in spherical coordinates, block 510 transfers control to block 525, otherwise block 510 transfers control to block 515.

If control is transferred to block 515 by block 510, block 515 obtains the data for the surface-normal 125, for example, by manual input from the computer user or from the computer-memory 360. Block 520 then converts the coordinates of the data for the surface-normal 120 into spherical coordinates, and control is transferred to block 530.

As an example of the coordinate conversion process of block 520, if the surface unit normal 120 is obtained in the Cartesian coordinates {X,Y,Z}, convert to spherical coordinates using the following equations:

latitude=arctan (Z/sqrt (X raised to the power of 2+Y raised to the power of 2))

longitude=arctan (Y/X)

While the orientation of the spherical coordinate system with respect to the Cartesian coordinate system is inconsequential, the above equations provide for positive latitudes for positive Z and negative latitudes for negative Z. Also, for the representative embodiment spherical coordinate values will be restricted to the following ranges: −π/2<=latitude<=π/2 and −π<=longitude<π.

Otherwise, if block 510 transferred control to block 525, block 525 obtains the data for the surface-normal 120, for example, from an external-data-source 385 as for example by manual input from the computer user, from computer-memory 360, or as values passed to the computer program at its initiation. Control then is transferred to block 530.

Block 530 transfers control to block 535 if the latitude 222 is equal to π/2. Otherwise block 530 transfers control to block 540.

If control is transferred to block 535, block 535 sets Q equal to the value "q_norms−1", and control is transferred to block 560.

Otherwise control is transferred to block 540. Block 540 quantizes the latitude 222 into one of the unit-sphere-latitude-bands 427, qlat, of width lat_size. qlat is computed as follows: qlat=(trunc ((latitude+π/2)/lat_size)*lat_size)−π/2. π/2 was added to the latitude 222 so that the truncation function would always operate on a positive number. π/2 was then subtracted from that truncated value. Control then is transferred to block 545.

Block 545 computes nqn_below_qlat, the number of quantized-surface-normals 425 below the unit-sphere-latitude-band 427 qlat. As previously stated, nqn_below_ qlat is also referred to as number-quantized-surface-normals-below-latitude-band 545. nqn_below_qlat is a non-negative integers and is obtained by treating it as proportional to the area of the unit-sphere 400 below the unit-sphere-latitude-band 427 qlat. The area of the unit-sphere 400 below the qlat band is calculated as: area_below_qlat=$2\pi$*(1+sin (qlat)). The floating point area value will be in the range 0<=area_below_qlat<$4\pi$. It will never be exactly $4\pi$, as this would require a latitude of $\pi/2$ which previously caused transfer of control to block 560. nqn_below_qlat is then computed as follows: nqn_below_qlat= round (q_norms*area_below_qlat/($4\pi$)). Control then is transferred to block 547.

Block 547 computes nqn_below_next_qlat, the number of unit-sphere-quantized-surface-normals 425 below the unit-sphere-latitude-band 427 just above qlat in a manner similar to the computation in block 545. As previously stated, nqn_below_next_qlat is also referred to as number-quantized-surface-normals-below-latitude-band 545. nqn_below_next_qlat is a non-negative integer and is obtained by treating it as proportional to the area of the unit-sphere 400 below the unit-sphere-latitude-band 427 just above qlat. The area of the sphere below this band is calculated as: area_below_next_qlat=$2\pi$(1+sin (qlat+lat_size)). The floating point area value will be in the range 0<area_below_next_qlat<=$4\pi$. It will never be exactly 0, as qlat is less than this band. nqn_below_qlat is then computed as follows: nqn_below_next_qlat=round (q_norms*area_below_next_qlat/($4\pi$)). nqn_below_next_qlat is a positive integer in the range 0<nqn_below_next_qlat<q_norms. Control then is transferred to block 550.

Block 550 computes nqn$_{13}$ qlat, the number of unit-sphere-quantized-surface-normals 425 contained within qlat, the unit-sphere-latitude-band 427. As previously stated, nqn_qlat is also referred to as number-quantized-surface-normals-in-latitude-band 550. nqn_qlat is the difference between nqn_below_qlat and nqn_below_next_qlat: nqn_qlat=nqn_below_next_qlat−nqn_below_qlat. Control then is transferred to block 555.

Block 555 computes Q, the unit-sphere-quantized-surface-normal 425 for the latitude and longitude. Q is computed as: Q=nqn_below_qlat+trunc ((nqn_qlat*(longitude+$\pi$))/$2\pi$). Control then is transferred to block 560.

Block 560 stores Q, the unit-sphere-quantized-surface-normal 425 for the latitude 222 and the longitude 223 of the surface-normal 120. Note that the unit-sphere-quantized-surface-normal 425 for the unit-sphere 400 is the same as the quantized-surface-normal 125 for the three-dimensional-figure 101. Q can be retrieved and used at a later time to render the three-dimensional-image 303. Control then is transferred to block 570.

Block 570 ends the program.

Figure 6:
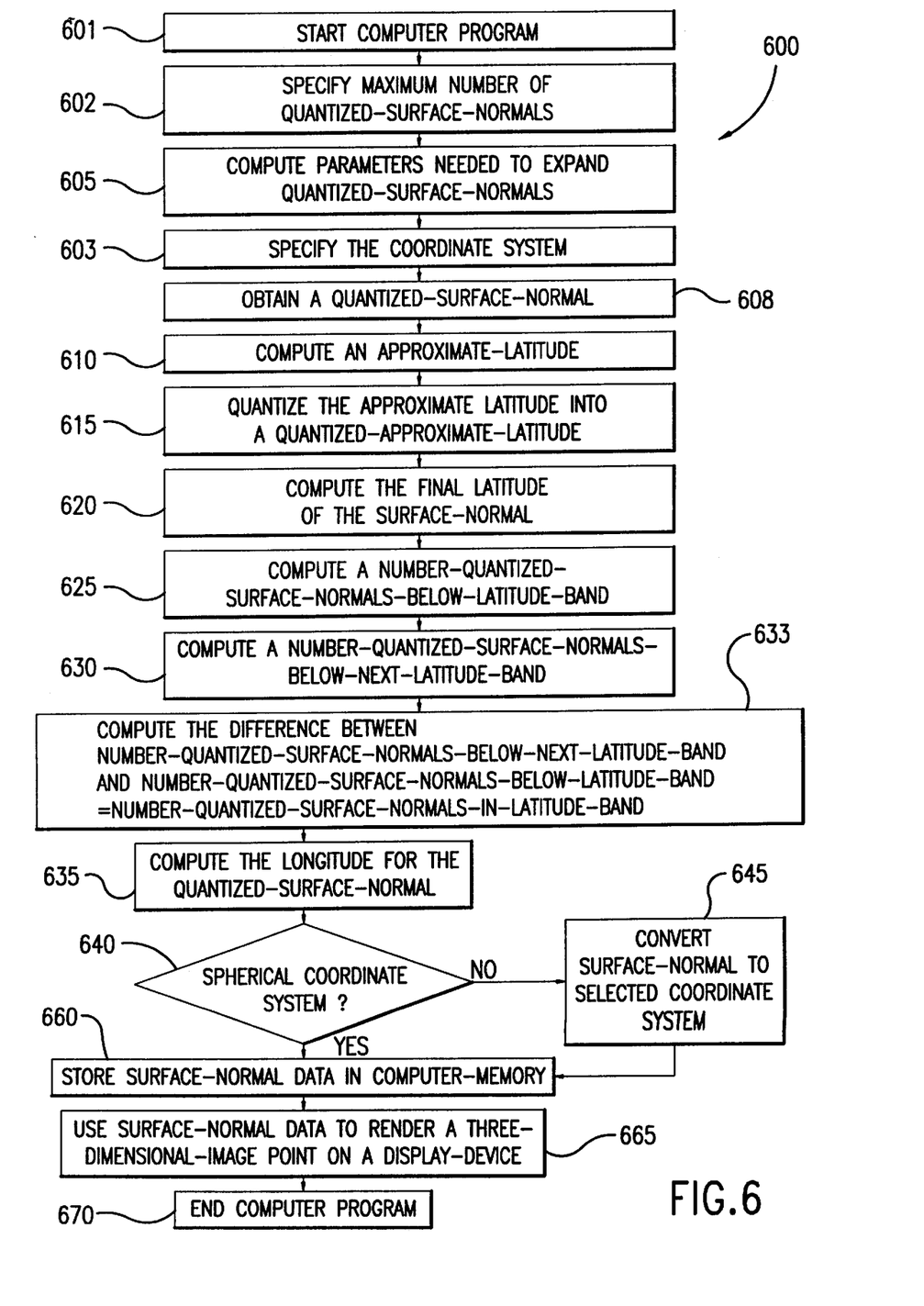
FIG. 6 is a flow chart of a computer program to expand a quantized surface unit normal into a surface unit normal according to a preferred embodiment of the invention.

FIG. 6 is a flowchart of a representative embodiment of the quantized-surface-normal-data-expansion-computer-program 600 that expands or maps the quantized-surface-normal 125 into the corresponding Cartesian, polar, spherical, or other coordinate system expanded-surface-unit-normal 130.

Block 601 is the entry block into the quantized-surface-normal-data-expansion-computer-program 600 and initiates the procedures described in the following paragraphs. Block 601 transfers control to block 605.

Block 605 then computes parameters which will be used in the blocks following. In particular, the width of the unit-sphere-latitude-band 427 or equivalently lat_size, the width of the unit-sphere-tile 410, is computed as follows: lat_size=2*sqrt($\pi$/q_norms). Also, the number of unit-sphere-quantized-surface-normals 425 which fit around the unit-sphere-equator 445 of the unit-sphere 400, e_q_norms, is computed as follows: e_q_norms =round(sqrt ($\pi$*q_norms)). As previously stated, e__norms is also referred to as equator-number-of-quantized-surface-normals 440. Control then is transferred to block 603.

Block 603 then ascertains the coordinate system in which the data for the quantized-surface-normal 125 is to be expanded into. Specification of the coordinate system may be obtained from the external-data-source 385, for example, by manual input from the computer user, from computer-memory 360, from a file stored on a floppy disk or a hard disk, or as values passed to the computer program at its initiation. Control then is transferred to block 610.

Two numbers are derived from Q in the following method steps. The first is the number of unit-sphere-quantized-surface-normals 425 below the unit-sphere-latitude-band 427 of the unit-sphere-quantized-surface-normal 425, and the second is the difference between the first value and Q, which is proportional to the longitude 223 of the three-dimensional-figure 101.

Block 610 computes the value of an approximate-latitude 610 which is represented by "pseudo_latitude". Pseudo_latitude is computed by noting that Q divided by q_norms is equal to the area of the unit-sphere 400 below the approximate-latitude 610 divided by the total area of the unit-sphere 400. As a result, pseudo_latitude=arcsin((2*(Q+0.5)/(q_norms))−1). Adding 0.5 to Q ensures that the range of Q values is distributed evenly over the range 0 to q_norms. Control then is transferred to block 615.

Block 615 quantizes the approximate-latitude 610 into a quantized-approximate-latitude 615, using the equation for quantizing the latitude 222 as follows: qlat=(trunc ((pseudo_latitude+$\pi/2$)/lat_size)*lat_size )−$\pi/2$. The resulting quantized latitude, qlat, indicates in which unit-sphere-latitude-band 427 the expanded-surface-unit-normal 130 lies. qlat is a floating point value. Control then is transferred to block 620.

Block 620 computes the final value for the latitude 222 of the expanded-surface-unit-normal 130 as follows: latitude= qlat+0.5*lat_size. Adding one-half lat_size to qlat ensures that the value obtained for the latitude 222 lies in the middle of the unit-sphere-latitude-band 427. Control then is transferred to block 625.

Block 625 computes nqn_below_qlat, the number of unit-sphere-quantized-surface-normals 425 below the latitude-band qlat. As previously stated, nqn_below_qlat is also referred to as number-quantized-surface-normals-below-latitude-band 625. nqn_below_qlat is a non-negative integer, and is obtained by treating it as proportional to the area of the unit-sphere 400 below qlat, the unit-sphere-latitude-band 427. The area of the unit-sphere 400 below qlat is calculated as: area_below_qlat=$2\pi$*(1+ sin (qlat)). The floating point area value will be in the range 0<=area_below_qlat<$4\pi$. nqn_below_qlat is then computed as follows: nqn_below_qlat=round (q_norms*area_below_qlat/($4\pi$)). Control then is transferred to block 630.

Block 630 computes nqn_below_next_qlat, the number of unit-sphere-quantized-surface-normals 425 below the unit-sphere-latitude-band 427 just above qlat. As previously stated, nqn_below_next_qlat is a positive integer, and is obtained by treating it as proportional to the area of the unit-sphere 400 below the unit-sphere-latitude-band 427 just above qlat. nqn_below_next_qlat is also referred to as number-quantized-surface-normals-below-next-latitude-band 630. The area of the unit-sphere 400 below the unit-sphere-latitude-band 427 just above qlat is calculated as: area_below_next_qlat=2π*(1+sin (qlat+lat_size)). The floating point area value will be in the range 0<area_below_next_qlat<=4π. nqn_below_next_qlat is then computed as follows: nqn_below_next_qlat=round (q_norms*area_below_next_qlat/(4π)). Control then is transferred to block 633. Block 633 computes the difference between the number of unit-sphere-quantized-surface-normals 425 below the unit-sphei-e-latitude-band 427 just above a quantized-approximate-latitude 615 and those below the quantized-approximate-latitude 615 as follows: nqn–qlat=nqn_below_next_qlat_nqn_below_qlat. As previously stated, this difference is also referred to as number-quantized-surface-normals-in-latitude-band 633. Control then is transferred to block 635.

Block 635 computes the longitude 223 for the quantized-surface-normal 125. The longitude 223 varies as the quantity (Q–nqn_below_qlat) relates to nqn_qlat. It is computed as follows: longitude=((Q–nqn_below_qlat)+0.5)/nqn_qlat) *2π)–π. The longitude will be in the range (–π<= longitude<π). Note that 0.5 is added into the difference between Q and nqn_below_qlat in order to place the value obtained in the center of the surface unit. Control then is transferred to block 640.

If the coordinate system desired for the expanded-surface-unit-normal 130 is spherical, block 640 transfers control to block 660. Otherwise, block 640 transfers control to block 645.

If control is transferred to block 645 by block 640, the expanded-surface-unit-normal 130 is converted to the specified coordinate system which is other than spherical coordinates. If, for example, a Cartesian result is desired, the spherical coordinates used in the above computations are translated into Cartesian coordinates by using the following equations:

$$x=\cos(\text{longitude})*\cos(\text{latitude})$$

$$y=\sin(\text{longitude})*\cos(\text{latitude})$$

$$z=\sin(\text{latitude})$$

Block 645 then transfers control to block 660.

Following transfer of control to block 660 by either block 640 or 645, the data for the expanded-surface-unit-normal 130 is stored by the computer-system 300 in computer-memory 360 which may be for example hard magnetic disk, floppy disk, or computer active memory. Control then is transferred to block 665.

Following transfer of control to block 665 by block 660, the data for the expanded-surface-unit-normal 130 is used to render the three-dimensional-image 303. Control then is transferred to block 670.

Block 670 terminates the program.

In addition to implementation as a software program or procedure, representative embodiments of the compression and expansion techniques could be implemented also in hardware, as for example in a graphics accelerator chip. In such embodiments, surface normal data could be transferred to the hardware implementation from an application or driver program or from additional upstream hardware in the graphics process flow.

A primary advantage of the example embodiment described herein over prior Cartesian, polar, spherical, and other coordinate representations is the efficient use of memory. A secondary advantage over these representations is the more uniform distribution of data accuracy. An important advantage over similar single value normal quantization methods is computation efficiency in the process of quantizing and expanding the normal.

An additional advantage is the increased accuracy obtained by supporting larger numbers of quantized surface unit normals. This accuracy can be provided because the number of quantized surface unit normals is not constrained to a lookup table with its system limited size. Since lookup tables are not used, this method also provides greater memory efficiency.

What is claimed is:

1. A method for compressing a surface-normal, the surface-normal specified by a latitude and a longitude within a surface-normal-coordinate-system, for a point on a surface of a three-dimensional-figure into a quantized-surface-normal, the quantized-surface-normal specified by identifying a unit-sphere-quantized-surface-normal whose value equals a unit-sphere-tile-number assigned to a unit-sphere-tile within a unit-sphere-latitude-band having a unit-sphere-latitude-band-width on a unit-sphere, wherein the unit-sphere is tessellated into a maximum-number-of-unit-sphere-tiles, wherein the latitude and the longitude of the surface-normal lie within the unit-sphere-tile, wherein an equator-number-of-quantized-surface-normals are placed around a unit-sphere-equator of the unit-sphere, and wherein intermediate variables a number-quantized-surface-normals-below-latitude-band, a number-quantized-surface-normals-below-next-latitude-band, and a number-quantized-surface-normals-in-latitude-band are used, comprising the steps of:

(a) tessellating the unit-sphere into approximate replicas of the unit-sphere-tile;

(b) obtaining the surface-normal of the point on the surface of the three-dimensional-figure;

(c) assigning the unit-sphere-tile-number of the unit-sphere-tile within which the surface-normal lies to the quantized-surface-normal; and (d) storing the quantized-surface-normal in a computer-memory.

2. The method as in claim 1 wherein:

Said step (a) comprises the steps of:
   (1) specifying the maximum-number-of-unit-sphere-tiles in which to tessellate the unit-sphere; and
   (2) computing the unit-sphere-latitude-band-width and the equator-number-of-quantized-surface-normals around the unit-sphere-equator;

Said step (b) comprises the steps of:
   (1) specifying the surface-normal-coordinate-system; and
   (2) if the surface-normal-coordinate-system is spherical,
      (I) obtaining the latitude and the longitude for the surface-normal of the point on the surface of the three-dimensional-figure;
   otherwise,
      (ii) obtaining coordinates defining the surface-normal of the point on the surface of the three-dimensional-figure; and
      (iii) computing the latitude and the longitude of the surface-normal in spherical coordinate system; and Said step (c) comprises the steps of
   (1) if the latitude of the surface-normal is π/2,
      (I) setting the quantized-surface-normal equal to the maximum-number-of-unit-sphere-tiles minus 1; and
   otherwise, (ii) quantizing the latitude of the surface-normal into the unit-sphere-latitude-band;
(iii) computing the number-quantized-surface-normals-below-latitude-band below the unit-sphere-latitude-band in which the surface-normal is located;
(iv) computing the number-quantized-surface-normals-below-next-latitude-band below the unit-sphere-latitude-band next above the unit-sphere-latitude-band in which the surface-normal is located;
(v) computing the number-quantized-surface-normals-in-latitude-band contained within the unit-sphere-latitude-band in which the surface-normal is located;
(vi) computing the unit-sphere-tile-number for the unit-sphere-tile which encompasses the latitude and the longitude of the point on the surface of the three-dimensional-figure and setting the unit-sphere-tile-number equal to the quantized-surface-normal.

3. The method as in claim 2 wherein:
the computer-memory comprises a hard magnetic disk, a floppy disk, and
a computer active memory.

4. A program storage medium readable by a computer-system having a computer-memory, tangibly embodying a computer program having instructions executable by the computer-system to perform method steps for compressing a surface-normal, the surface-normal specified by a latitude and a longitude within a surface-normal-coordinate-system, for a point on a surface of a three-dimensional-figure into a quantized-surface-normal, the quantized-surface-normal specified by identifying a unit-sphere-quantized-surface-normal whose value equals a unit-sphere-tile-number assigned to a unit-sphere-tile within a unit-sphere-latitude-band having a unit-sphere-latitude-band-width on a unit-sphere wherein the unit-sphere is tessellated into a maximum-number-of-unit-sphere-tiles, wherein the latitude and the longitude of the surface-normal lie within the unit-sphere-tile, wherein an equator-number-of-quantized-surface-normals are placed around a unit-sphere-equator of the unit-sphere, and wherein said computer program uses intermediate variables a number-quantized-surface-normals-below-latitude-band, a number-quantized-surface-normals-below-next-latitude-band, and a number-quantized-surface-normals-in-latitude-band, said method steps comprising:
(a) tessellating the unit-sphere into approximate replicas of the unit-sphere-tile;
(b) obtaining the surface-normal of the point on the surface of the three-dimensional-figure;
(c) assigning the unit-sphere-tile-number of the unit-sphere-tile within which the surface-normal lies to the quantized-surface-normal; and
(d) storing the quantized-surface-normal in the computer-memory.

5. The program storage medium as in claim 4 wherein:
Said step (a) comprises the steps of:
(1) specifying the maximum-number-of-unit-sphere-tiles in which to tessellate the unit-sphere; and
(2) computing the unit-sphere-latitude-band-width and the equator-number-of-quantized-surface-normals around the unit-sphere-equator;
Said step (b) comprises the steps of:
(1) specifying the surface-normal-coordinate-system; and
(2) if the surface-normal-coordinate-system is spherical,
(I) obtaining the latitude and the longitude for the surface-normal of the point on the surface of the three-dimensional-figure;
otherwise,
(ii) obtaining coordinates defining the surface-normal of the point on the surface of the three-dimensional-figure; and
(iii) computing the latitude and the longitude of the surface-normal in spherical coordinate system; and
Said step (c) comprises the steps of
(1) if the latitude of the surface-normal is $\pi/2$,
(I) setting the quantized-surface-normal equal to the maximum-number-of-unit-sphere-tiles minus 1; and
otherwise,
(ii) quantizing the latitude of the surface-normal into the unit-sphere-latitude-band;
(iii) computing the number-quantized-surface-normals-below-latitude-band below the unit-sphere-latitude-band in which the surface-normal is located;
(iv) computing the number-quantized-surface-normals-below-next-latitude-band below the unit-sphere-latitude-band next above the unit-sphere-latitude-band in which the surface-normal is located;
(v) computing the number-quantized-surface-normals-in-latitude-band contained within the unit-sphere-latitude-band in which the surface-normal is located;
(vi) computing the unit-sphere-tile-number for the unit-sphere-tile which encompasses the latitude and the longitude of the point on the surface of the three-dimensional-figure and setting the unit-sphere-tile-number equal to the quantized-surface-normal.

6. The program storage medium as in claim 5 wherein:
the computer-memory comprises a hard magnetic disk, a floppy disk, and
a computer active memory.

* * * * *

UNITED STATES PATENT AND TRADEMARK OFFICE
CERTIFICATE OF CORRECTION

PATENT NO.     : 6,191,791 B1
DATED          : February 20, 2001
INVENTOR(S)    : Don W. Dyer et al.

It is certified that error appears in the above-identified patent and that said Letters Patent is hereby corrected as shown below:

Column 12,
Line 11, before "method" insert -- computer-implemented --
Line 11, delete "compressing" and insert therefor -- reducing memory requirements for storing --
Line 11, before "surface-normal" insert -- 3D --
Line 37, after "(d) storing the" delete "quantized-surface-normal" and insert therefor -- unit-sphere-tile-number --

Column 13,
Line 29, delete "compressing" and insert therefor -- reducing memory requirements for storing --
Line 30, before "a surface-normal" insert -- 3D --
Line 57, after "(d) storing the" delete "quantized-surface-normal" and insert therefor -- unit-sphere-tile-number --

Signed and Sealed this

Twenty-second Day of October, 2002

*Attest:*

JAMES E. ROGAN
*Director of the United States Patent and Trademark Office*

*Attesting Officer*